United States Patent
Orkisz

[11] Patent Number: 5,862,930
[45] Date of Patent: Jan. 26, 1999

[54] PRODUCT HOLDING AND DISPLAYING CONTAINER

[75] Inventor: Rudolf P. Orkisz, Monroe, Conn.

[73] Assignee: Inline Plastics Corporation, Shelton, Conn.

[21] Appl. No.: 880,256

[22] Filed: May 23, 1997

[51] Int. Cl.$^6$ ........................................ B65D 6/28
[52] U.S. Cl. .................. 220/4.23; 220/4.21; 220/608; 220/665
[58] Field of Search .................. 220/4.21–4.24, 220/662, 665, 602, 631, 635, 574, DIG. 12, DIG. 13, 605, 608

[56] References Cited

U.S. PATENT DOCUMENTS

| | | | |
|---|---|---|---|
| 1,288,799 | 12/1918 | Ayres et al. | 220/4.21 |
| 3,422,979 | 1/1969 | Carlson et al. | 220/631 |
| 3,835,482 | 9/1974 | Tersch | 220/608 |
| 4,445,250 | 5/1984 | Seidl | 220/4.21 |
| 4,547,926 | 10/1985 | Kern | 220/4.21 |
| 5,169,014 | 12/1992 | Hexamer | 220/4.22 |
| 5,405,009 | 4/1995 | Hackenbracht | 220/4.22 |
| 5,577,627 | 11/1996 | Richie-Dubler | 220/4.23 |
| 5,641,087 | 6/1997 | Moffitt | 220/608 |

FOREIGN PATENT DOCUMENTS

| | | | |
|---|---|---|---|
| 728823 | 12/1942 | Germany | 220/4.24 |
| 391202 | 8/1965 | Switzerland | 220/4.22 |

Primary Examiner—Stephen J. Castellano
Attorney, Agent, or Firm—Melvin I. Stoltz

[57] ABSTRACT

A unique, lockable or closable, reusable product holding and displaying container system which virtually eliminates breakage of fragile products is achieved by providing a product holding supporting base and a ramped, sloping product support surface cooperatively associated therewith and extending upwardly from the base. By employing the present invention, each of the products distributed and retained in the container system is maintained in a side-by-side, contacting relationship, angularly disposed relative to the supporting base, with the angle defined by the ramped, support surface. In this way, each product is in direct, contacting, engagement with each adjacent product, with each product fully supported in this position. As a result, no product is placed in a position wherein unwanted stress or breakage points exist which would otherwise cause the fragile product to be broken.

17 Claims, 3 Drawing Sheets

5,862,930

PRODUCT HOLDING AND DISPLAYING CONTAINER

TECHNICAL FIELD

This invention relates to product holding and displaying containers and, more particularly, to two-piece container systems and/or clamshell container systems which are constructed for improved holding and displaying of fragile products.

BACKGROUND ART

One of the problems which manufacturers of various products must consistently face is the type of container in which the products are to be placed for sale and distribution to the customers. Although the products being distributed to consumers is widely diverse, manufacturers and/or distributors of consumable or edible products, particularly baked goods, face unique problems in the selection of a suitable container.

Typically, manufacturers wish to have their products retained in a sealed or securely locked container to prevent spoilage or tampering, while also incorporating a product holding zone which is transparent, to allow the consumer to see the product being purchased. In addition, the container must also be inexpensive, preferably formed of recyclable material, and reusable. Generally, prior art containers are formed by employing either entirely or, in part, thin plastic material which is thermoformed or vacuum-formed into the desired shape, since both of these processes provide products which are inexpensive.

Typically, the size and shape of products sold in container systems of this general nature are widely varied. However, the container systems employed by most manufacturers for similar products tend to be substantially identical in form and construction. In this regard, prior art systems for fresh baked goods usually comprise a two-piece container or a one-piece container formed in a clamshell-type structure wherein one container piece is affixed to the other container piece along one edge, forming a pivot interconnection between the two cooperating pieces. At least one of the remaining three free edges of the clamshell structure incorporates lock means for securely affixing the two members together once the desired product has been positioned therein.

In the two-piece containers, one member comprises a base or product holding member which cooperates with a second member that overlies or peripherally surrounds and encloses the base. Generally, both one-piece and two-piece containers are quite popular and are used for a wide range of products including bakery items.

One advantage of these one-piece or two-piece containers is the ability to incorporate a lock or closure system which allows the container to be reused, thereby enabling the consumer to store unused portions of the product in the container after the container has been opened. As a result, these types of containers are extremely popular and have gained wide acceptance by manufacturers, distributors, and customers.

In both the one-piece and two-piece constructions, container systems have been developed for retaining a plurality of similar shaped, fragile products. These containers are most particularly suited for securely retaining and storing bakery items, particularly fragile bakery products such as cookies.

In dealing with fragile products, such as cookies, special care must be exercised in order to prevent unwanted breakage of the product during transportation to the retail outlet, as well as handling by both the retail outlet and the consumer. In order to reduce breakage of fragile products, most container systems employ a product holding member which allows all of the products to be placed in one or two continuous rows with each product in direct abutting contact with substantially the entire adjacent product. In this way, movement of any single product relative to an adjacent product or the holding member itself is reduced and unwanted breakage is substantially controlled.

Although the retention of fragile products, such as cookies, or other bakery products, in substantially continuous, elongated rows is preferred for reducing breakage, this construction is limited to certain types of products and cannot be universally employed for all such products. In particular, bakery products, and specialty items, particularly edible consumer products, are incapable of being sold in elongated continuous rows due to many consumer factors.

One such pertinent factor is the requirement by many consumers that the product be visible in its substantial entirety prior to purchase. As a result, not only must the container be completely transparent, in order to allow the products retained therein to be completely visible to the consumer, but the products are preferably displayed in an angularly disposed, product overlying, generally shingled configuration. In this way, optimum visibility of each product is provided in order to satisfy this consumer desire.

Although this angularly disposed, shingled, visual display is preferred by consumers, manufacturers have found that displays of this nature are disadvantageous due to breakage of the fragile products which often occurs. Since products displayed in this manner employ one or more products at one end of the slanted row of product as the means for achieving the angular relationship, products overlying each other at different angular relationships, forms breakage or stress points along the contact zones.

Consequently, during normal transportation, distribution, as well as storage at home by the consumer, the movement of the container with the products retained therein, causes the fragile products to arcuately flex and pivot about the stress points, breaking the fragile product in the container. As a result, when such breakage occurs in the retail outlet, consumers avoid purchasing such products due to their damaged condition. As a result, added costs are incurred since these products are ultimately returned to the manufacturer or discounted for sale.

Although this problem exists with most containers of this type and has produced substantial objections by consumers, prior art containers have been incapable of eliminating the inherent problems.

Therefore, it is a principal object of the present invention to provide a product holding and displaying container system which prevents fragile baked products from being broken, while also being completely reusable by the consumer after purchasing.

Another object of the present invention is to provide a product holding and displaying container system having the characteristic features described above which can be repeatedly opened and closed by the consumer with ease, assuring storage of the product whenever desired, without damaging the product.

Another object of the present invention is to provide a product holding and displaying container system having the characteristic features described above wherein a support system is integrally formed in the container to prevent the products from being damaged.

Another object of the present invention is to provide a product holding and displaying container system having the characteristic features described above which is inexpensive to manufacture and can be made entirely from recyclable material.

Another object of the present invention is to provide a product holding and displaying container system having the characteristic features described above which is completely disposable when the product has been entirely used.

Other and more specific objects will in part be obvious and will in part appear hereinafter.

SUMMARY OF THE INVENTION

By employing the present invention, all of the difficulties and drawbacks found in the prior art constructions are eliminated and an easily employed, lockable or closable, reusable product holding and displaying container system is realized which virtually eliminates breakage of fragile products. In addition, the container system of the present invention is capable of being manufactured comparatively inexpensively, while also being fully disposable when its use is no longer desired. Furthermore, by employing recyclable materials for the container system of the present invention, an environmentally friendly product is attained.

In accordance with the present invention, the prior art difficulties and drawbacks are eliminated by constructing a container system which comprises a product holding supporting base and a ramped, sloping product support surface cooperatively associated therewith, extending upwardly from the base. By employing these two components in the manner detailed herein, a unique product holding and displaying container system is realized.

Prior to the present invention, product holding container systems were incapable of providing a product holding and displaying construction which enabled fragile products to be securely retained and displayed without incurring breakage. However, by employing the present invention, such fragile products are fully supported in a container system which virtually eliminates breakage of the fragile products, while also enabling the products to be displayed in the most desirable manner. Furthermore, although the container system of the present invention can be employed for all fragile products which have experienced breakage during distribution in prior art container systems, the present invention has been found to be particularly well-suited for securely retaining food products, such as cookies, which suffer the greatest damage during distribution, sale, and storage.

As discussed above, it has been found that consumers prefer to have food products displayed in a manner which enables the consumer to visually observe the product in its entirety or substantial entirety to be certain that the product being purchased meets the demands of the consumer. In this regard, consumers wish to be able to inspect the product to assure that the product being purchased appears to be fresh and undamaged.

By employing the present invention, containers are formed which securely retain fragile products in a manner which virtually eliminates breakage of the product, while also enabling consumers to completely inspect the product being purchased. Furthermore, the container system of the present invention further provides, in its preferred constructions, a completely sealed container system, thereby assuring consumers that the product has not been previously opened or tampered with.

By constructing the container system with a ramped, sloping product support surface which is cooperatively associated with an adjacent supporting base for retaining the desired product, each of the products distributed and retained in the container system of the present invention is maintained in a side-by-side relationship, angularly disposed relative to the supporting base, with the angle defined by the ramped, support surface. In this way, each product is in direct, contacting, engagement with each adjacent product, with each product fully supported in this position. As a result, no product is placed in a position wherein unwanted stress or breakage points exist which would otherwise cause the fragile product to be broken.

Furthermore, by employing the present invention, a thermoformed or vacuum formed plastic container can be constructed in either a single piece or two-piece configuration. By employing transparent plastic for the container system, complete visibility of the product retained in the container is provided. Consequently, although the present invention can be implemented in containers formed of cardboard, paper and the like, the preferred construction employs thermoformed or vacuum formed clear plastics to assure complete visibility of the product with the highest degree of convenience for consumers.

The invention accordingly comprises an article of manufacture, possessing the features, properties, and relation of elements which will be exemplified in the article hereinafter described and the scope of the invention will be indicated in the claims.

THE DRAWINGS

For a fuller understanding of the nature and objects of the invention, reference should be had to the following detailed description taken in connection with the accompanying drawings, in which.

DETAILED DESCRIPTION

Figure 1:
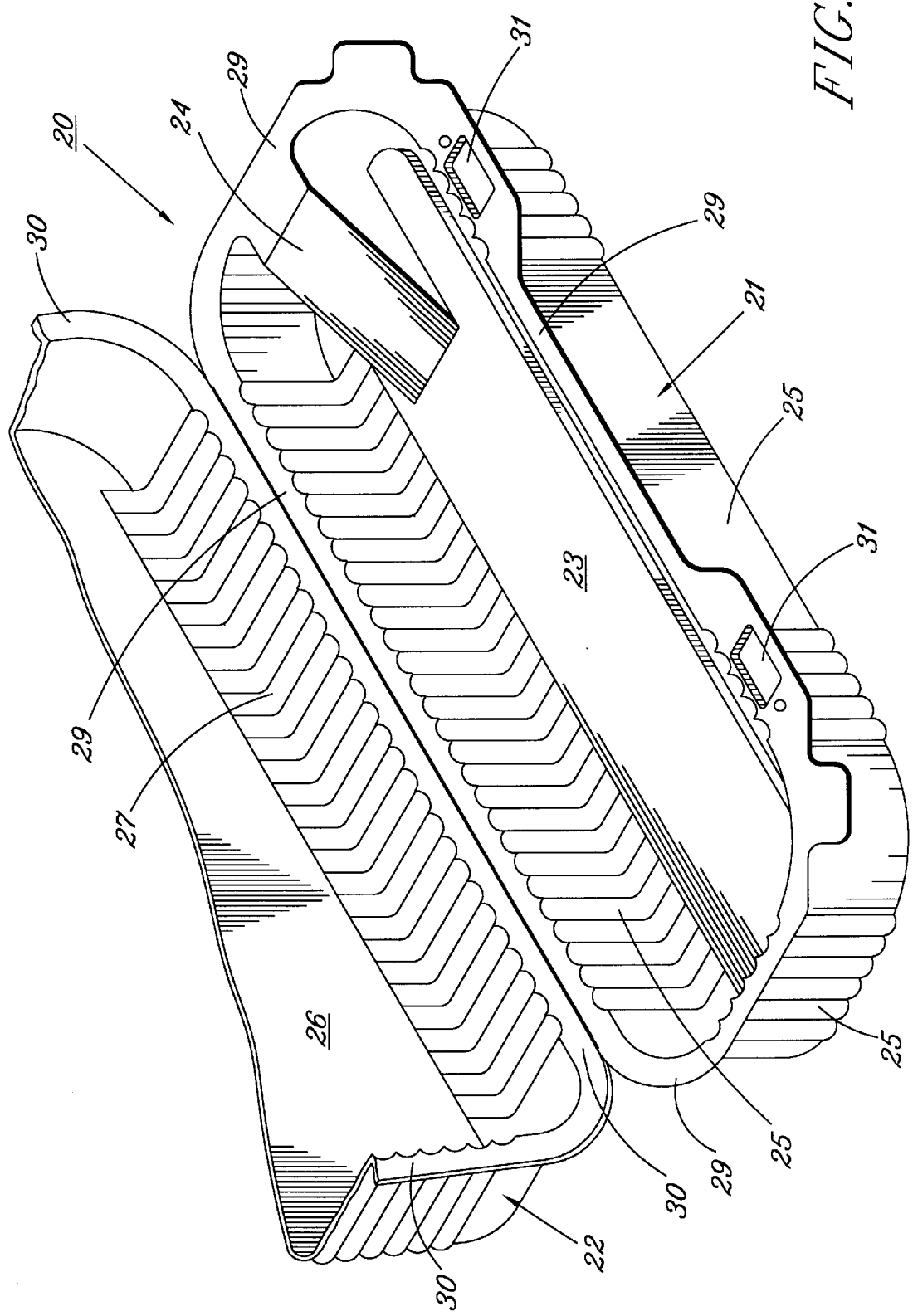
FIG. 1 is a perspective view, partially broken away, showing the product holding and displaying container system of the present invention.
Figure 2:
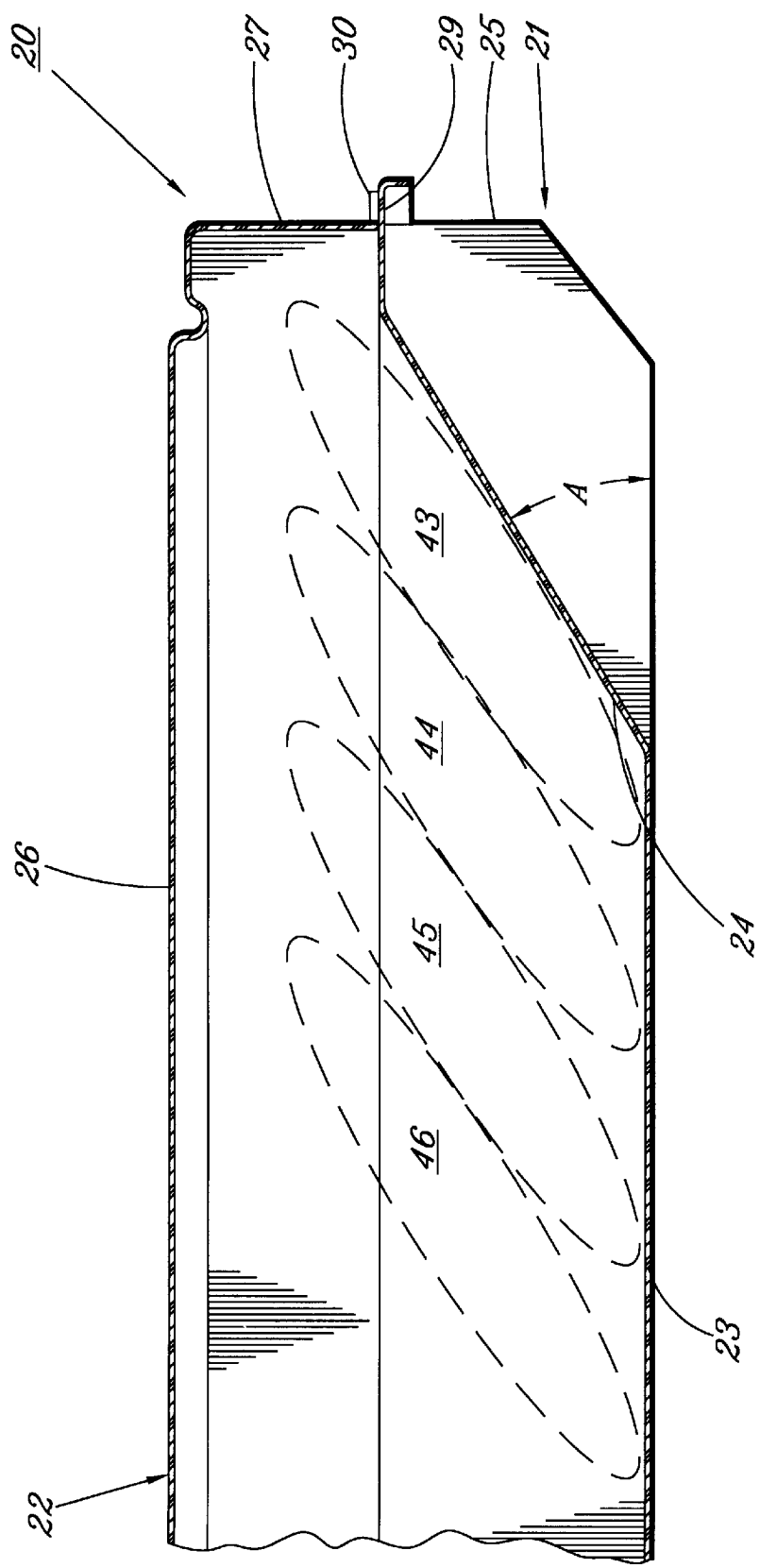
FIG. 2 is a cross-sectional, side elevation view, partially broken away, depicting the product holding and displaying container system of FIG. 1.

In FIGS. 1–2, the preferred embodiment of container system 20 of the present invention is depicted. As shown, container system 20 is constructed for securely and safely retaining a plurality of specialty cookies as the desired product. Furthermore, container system 20 is depicted as a once-piece clamshell construction. As is evident to one of ordinary skill in the art, the present invention can be constructed as a two-piece container, as well as being constructed for retaining alternate products for which a secure holding system is desired. Consequently, it is to be understood that the container system depicted in FIGS. 1–2, as well as its use with cookies as the product, is merely for exemplary purposes and is not intended to limit the present invention.

As shown in FIGS. 1–2, product holding and displaying container system 20 comprises a base portion 21 and a cover portion 22. As depicted, cover portion 22 and base portion 21 are integrally interconnected along one edge thereof, thereby forming a one-piece clamshell construction. However, if desired, two separate and independent portions can be employed without departing from the scope of the present invention.

In the preferred embodiment, product holding and displaying container system 20 is formed from thermoformed plastic material. By employing plastic material which is transparent, complete visibility of the product retained in container system 20 is attained. In this way, consumers are capable of visually inspecting the product in their substantial entirety before purchasing the product.

In order to attain a product holding and displaying container system 20 which prevents unwanted breakage of fragile products and provides a complete support system for maximum display of such products, base portion 21 of container system 20 comprises product supporting base 23 and ramped, sloping, product support surface 24 cooperatively associated therewith.

In the preferred embodiment, product supporting base 23 and ramped sloping surface 24 are cooperatively associated with each other and formed in a substantially unitary construction. Furthermore, as part of the preferred unitary construction, base portion 21 also incorporates an upstanding wall 25 which peripherally surrounds and encloses product supporting base 23 and upstanding, ramped, sloping surface 24. Although this construction is preferred, the present invention can be employed in a plurality of alternate configurations and constructions, such as incorporating a separate insert comprising a product supporting base and upstanding ramped sloping surface or, alternatively, separate components which are assembled for cooperative association.

In order to complete the construction of the preferred embodiment of product holding and displaying container system 20 of the present invention, cover portion 22 comprises base 26 and wall 27 integrally connected therewith and peripherally surrounding base 26. In addition, base portion 21 incorporates flange 29 which extends from the terminating edge of wall 25, peripherally surrounding wall 25 and radially extending outwardly therefrom. Similarly, cover portion 22 also incorporates a flange 30 which radially extends outwardly from the terminating edge of wall 27, in peripheral surrounding cooperation therewith.

The construction of product holding and displaying container system 20 is completed by incorporating locking means 31 in flanges 29 and 30, positioned for cooperative interengagement with each other. In this way, the arcuate pivoted movement of cover portion 22 relative to base portion 21 enables product holding and displaying container system 20 to be repeatedly closed and open, at the user's convenience, in order to gain access to the interior of product holding and displaying container system 20 and the products retained therein. Furthermore, by employing this construction, repeated access to the product retained in container system 20 is provided, thereby enabling the consumer to use container system 20 as a storage medium for the product retained therein. Once the product has been fully consumed, the entire product holding displaying container system 20 can be discarded by the consumer.

Figure 3:
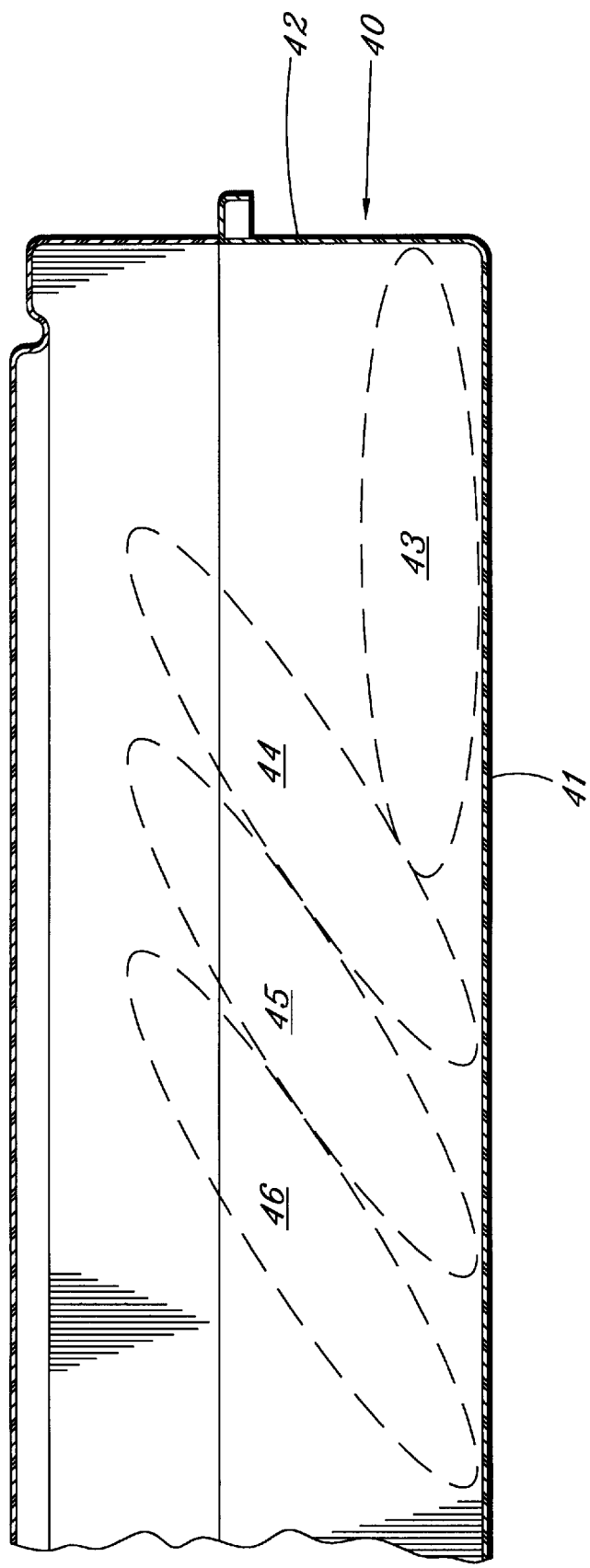
FIG. 3 is a cross-sectional side elevation view depicting a conventional prior art container.

In order to best understand the unique achievement attained by the present invention and its ability to eliminate breakage of fragile products retained in a container system, reference should be made to FIG. 3, along with the following discussion. In FIG. 3, a conventional prior art container system is depicted with fragile, specialty cookie products retained therein in their conventional manner.

As discussed above, large diameter, specialty cookies are typically displayed in containers which allows the cookies to be angularly disposed relative to each other and the base of the container. In this way, consumers are able to visually inspect such products prior to purchase in order to assure the quality of the product being purchased. By placing such products in an angularly disposed manner, substantially greater portions of each cookie product is visually observable by a consumer. As a result, as shown in FIG. 3, a prior art container 40 incorporating a base 41 and a peripherally surrounding, upstanding wall 42 represents a conventional construction employed for housing such products and enabling such products to be displayed in the preferred manner.

In order to enable such products to be displayed in prior art container 40 in the most desirable manner, wherein the products are angularly disposed relative to each other, cookie product 43, positioned at one end of container 40, is placed directly on base 41 with substantially the entire surface of cookie 43 contacting base 41. Then, the second cookie 44 is placed adjacent cookie 43 in contact with the edge thereof, so as to allow cookie 44 to be angularly disposed relative to base 41. This process is then continued, with each adjacent cookie 45, 46, etc., being angularly disposed relative to base 41 in contact with the adjacent cookies.

As is evident from FIG. 3, when this arrangement is employed, cookies 44 and 45 are not completely in contact with adjacent cookies. Instead, these cookies are angularly disposed at different angles relative to adjacent cookies. Furthermore, cookie 44 is retained in container 40 with a stress point formed at the contact point between cookie 44 and cookie 43. Similarly, cookie 45 is typically mounted in partial contact with cookie 44, establishing a stress point at the contact zone.

As a result, during normal transportation, distribution, and storage of container 40 with the cookies retained therein, cookie 44 is often broken during movement of container 40, due to the precarious storage conditions and the stress point introduced by such storage conditions. Similarly, cookie 45 is also often broken due to the additional stress points introduced between the contact between cookie 44 and cookie 45.

This prior art construction and product storage arrangement has continuously suffered with this problem wherein fragile products are damaged. As a result, consumers have been unhappy with the purchase of such damaged products or, in some instances, rejecting the purchase of such products, necessitating the return of such products to the manufacturer.

In spite of these problems, prior art container systems have been incapable of eliminating the difficulties encountered with this storage system, while still providing a product display arrangement of this nature. However, with the present invention, all of the difficulties, drawbacks and inability of this prior art system are eliminated and a fragile product holding and displaying container system is realized which virtually eliminates breakage of fragile products.

As clearly shown in FIG. 2, product holding and displaying container system 20 of the present invention incorporates base portion 21 which comprises product supporting base 23 and upstanding, ramped, sloping surface 24 extending from base 23 at a fixed arcuate angle "A". By providing ramped, sloping surface 24 extending from base 23 at a fixed angle "A", a secure, product retaining and supporting system is realized.

In order to best understand the construction and operation of the present invention and the manner in which fragile products are protected from breakage, product holding and displaying container system 20 is depicted in FIG. 2 with cookies retained therein as the fragile products. In this regard, cookie 43 is shown, positioned on sloping surface 24 of base portion 21. In this position, cookie 43 is securely supported in its entirety and retained in a way which prevents any possibility of breakage thereto.

By employing the present invention, cookie product 43 rests completely on sloping surface 24 with the terminating end of cookie product 43 supported by base 23. As a result, cookie product 43 is completely supported, while being maintained in an arcuately disposed angular position relative to base 23, securely held in a damage-free configuration.

Furthermore, by supporting cookie 43 in the precisely desired angular position for displaying cookie 43, adjacent cookie 44 is placed on support base 23, with cookie 44 in supporting contact with cookie 43, engaging cookie 43 in its substantial entirety. As a result, both cookies 43 and 44 are positioned in the identical angular relationships relative to each other, as well as relative to support base 23, with each cookie being fully supported by each other. In this way, all stress points and potential breakage zones are eliminated and cookies 43 and 44 are securely retained in product holding and displaying container system 20 with possibility of breakage of these products virtually eliminated.

Similarly, all of the remaining cookie products retained in container system 20, such as cookies 45 and 46 are placed in sloping, adjacent, contacting relationship with adjacent cookie products, fully and completely supported on both sides thereof, by said adjacent cookie products. As a result of this construction, every cookie product placed in container system 20 is fully and completely supported in a secure, breakage-free configuration, enabling container system 20 to be transported, handled, and stored both in the distribution outlet as well as in the home environment without fear of any cookie product being broken due to displayed retention in container system 20.

Furthermore, by employing the present invention, wherein sloping, ramped surface 24 is angularly disposed relative to product support base 23 to establish a secure, product holding and supporting surface for eliminating breakage thereof, the consumer is assured that products contained in container system 20 remain free from breakage, even during use and removal of cookies from the container system 20, while employing container system 20 for storage of unused products. As a result, all of the drawbacks and difficulties found in prior art systems are virtually eliminated and a trouble-free, breakage-free, product holding and displaying container system 20 is realized which virtually eliminates any possibility that breakage of fragile products will occur.

As is evident to one of ordinary skill in the art, the arcuate angle at which ramped, sloping surface 24 is positioned relative to base 23 can be varied, depending upon the size, shape, and type of product employed for secure, safe retention thereby. Generally, it has been found that angle ""A" preferably ranges between about 20° and 65° to attain the desired secure support and visual display. Furthermore, an angle of about 45° has been found to be applicable to most products. However, by incorporating a ramped, sloping surface upwardly extending from a support base 23 for use as a support surface for the products retained therein, the present invention can be implemented and successfully employed for eliminating unwanted breakage of fragile products while achieving full visual display of the product.

It will thus be seen that the objects set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, that I claim as new and desire to secure by Letters Patent is:

1. A container system constructed for safely holding and displaying fragile products comprising:
   A. a base member incorporating wall means peripherally surrounding a support base;
   B. a cover member cooperatively associated with the base member for forming the product container;
   C. a first support surface comprising a substantially enlarged planar zone cooperatively associated with the base member for receiving and supportingly retaining a plurality of products thereon; and
   D. a second support surface
      a. cooperatively associated with the first support surface and extending upwardly relative to the first support surface in a ramped, sloping, angular relationship therewith, establishing a support zone for receiving and retaining at least one of said products to enable said product to be supportingly maintained at a first angle relative to the first surface and;
      b. positioned in juxtaposed, spaced relationship with a portion of the wall means of the base member for defining said support zone independently of said wall member; whereby a product container is realized which is capable of supporting a plurality of products in juxtaposed, side-to-side, contacting relationship with each of said products maintained at substantially identical angular positions.

2. The container system defined in claim 1, wherein said first support surface and said second support surface are further defined as being interconnected to each other with said second surface being interconnected with one terminating end of said first support surface.

3. The container system defined in claim 2, wherein said base member is further defined as comprising a unitary construction, with said first support surface and said second support surface forming a portion thereof.

4. The container system defined in claim 2, wherein said second support surface is further defined as being angularly disposed relative to the first support surface at an angle ranging between about 20° and 65°.

5. The container system defined in claim 4, wherein said second surface is further defined as being angularly disposed relative to the first surface at an angle of 45°.

6. The container system defined in claim 1, wherein said base member and said cover member are further defined as being integrally interconnected with each other along one common edge, thereby forming a clamshell configuration.

7. The container system defined in claim 6, wherein said base member and said cover member are further defined as being formed from transparent plastic material for providing complete visibility of any product retained therein.

8. The container system defined in claim 1, wherein said base member is further defined as comprising a continuous wall peripherally surrounding the first support surface and said second support surface in cooperating association therewith for assisting and retaining any product placed thereon.

9. The container system defined in claim 8, wherein said base member comprises a unitary component with the first support surface, second support surface, and surrounding walls being formed as a single, integral component.

10. A container system constructed for safely holding and displaying fragile products comprising:
   A. a base member comprising a bottom surface and an integrally connected, peripherally surrounding wall;
   B. a cover member cooperatively associated with the base member for forming the product container with said base member and said cover member being integrally interconnected with each other along one common edge to form a clamshell configuration;
   C. a first support surface comprising a substantially enlarged planar zone cooperatively associated with the base member for receiving and supportingly retaining a plurality of products thereon; and
   D. a second support surface
      a. cooperatively associated with and interconnected to the first support surface,
      b. inwardly spaced from a portion of said wall for providing a support zone independent of said wall,
      c. extending upwardly relative to the first support surface in a ramped, sloping, angular relationship therewith, establishing a support zone for receiving and retaining at least one of said products to enable said product to be supportingly maintained thereon, and
      d. being angularly disposed relative to the first support surface at an angle ranging between about 20° and 65°;
   whereby a product container is realized which is capable of supporting a plurality of products in juxtaposed, side-to-side, contacting relationship with each of said products maintained at substantially identical angular positions.

11. The container system defined in claim 10, wherein said second surface is further defined as being angularly disposed relative to the first surface at an angle of 45°.

12. The container system defined in claim 10, wherein said base member and said cover member are further defined as being formed from transparent plastic material for providing complete visibility of any product retained therein.

13. A container system constructed for safely holding and displaying a plurality of fragile products in a juxtaposed, side-to-side relationship comprising:
   A. a base member comprising a bottom surface and wall means integrally connected, and peripherally surrounding the bottom surface;
   B. a cover member cooperatively associated with the base member for forming the product container;
   C. a first support surface comprising a substantially enlarged planar zone cooperatively associated with the base member for receiving and supportingly retaining a plurality of products thereon in juxtaposed, side-to-side relationship; and
   D. a second support surface
      a. cooperatively associated with and interconnected to the first support surface,
      b. inwardly spaced from a portion of said wall means for providing a support zone independent of said wall means,
      c. extending upwardly relative to the first support surface in a ramped, sloping, angular relationship therewith, establishing a support zone for receiving and retaining at least one of said products to enable said product to be supportingly maintained thereon in a substantially equivalent angular relationship with the first support surface while enabling each of the other products to be maintained in a similarly angular relationship with the first support surface while in juxtaposed, side-to-side contact with each other, and
      d. being angularly disposed relative to the first support surface at an angle ranging between about 20° and 65°;
   whereby a product container is realized which is capable of supporting a plurality of products in juxtaposed, side-to-side relationship with each of said products maintained at substantially identical angular positions.

14. The container system defined in claim 13, wherein said second surface is further defined as being angularly disposed relative to the first surface at an angle of 45°.

15. The container system defined in claim 13, wherein said base member and said cover member are further defined as being formed from transparent plastic material for providing complete visibility of any product retained therein.

16. The container system defined in claim 15, wherein said system is formed as a one-piece, integral unit with the support base forming the first support surface and the second support surface is interconnected to the wall means.

17. The container system defined in claim 16, wherein said container is constructed by one selected from the group consisting of thermoforming and vacuum forming.

* * * * *